United States Patent
Schmid et al.

[11] Patent Number: 5,926,907
[45] Date of Patent: *Jul. 27, 1999

[54] WIPER BLADE REPLACEMENT ASSEMBLY

[75] Inventors: Eckhardt Schmid, Brackenheim; Bruno Egner-Walter, Heilbronn; Klaus Jaisle, Leingarten; Klauspeter Noack, Obersulm; Eduard Schill, Wiernsheim, all of Germany

[73] Assignee: ITT Automotive Europe GmbH, Frankfurt, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/750,258
[22] PCT Filed: Apr. 27, 1995
[86] PCT No.: PCT/EP95/01596
§ 371 Date: Nov. 20, 1996
§ 102(e) Date: Nov. 20, 1996
[87] PCT Pub. No.: WO95/32112
PCT Pub. Date: Nov. 30, 1995

[30] Foreign Application Priority Data

May 20, 1994 [DE] Germany ............... 44 17 713

[51] Int. Cl.⁶ ...................................... B60S 1/38
[52] U.S. Cl. ............... 15/250.361; 15/250.454; 15/250.452
[58] Field of Search ......... 15/250.94, 250.451, 15/250.452, 250.453, 250.454, 250.361, 250.48, 250.43

[56] References Cited

U.S. PATENT DOCUMENTS

| | | | |
|---|---|---|---|
| 2,983,945 | 5/1961 | De Pew | 15/250.454 |
| 4,679,276 | 7/1987 | Tomkin | 15/250.454 |
| 5,023,972 | 6/1991 | Bauer et al. | 15/250.453 |
| 5,493,750 | 2/1996 | Bollen et al. | 15/250.44 |
| 5,522,113 | 6/1996 | White | 15/250.452 |

FOREIGN PATENT DOCUMENTS

| | | |
|---|---|---|
| 007017A1 | 1/1980 | European Pat. Off. . |
| 0646507A2 | 4/1995 | European Pat. Off. . |
| 2506128A1 | 8/1975 | Germany . |
| 2948903A1 | 6/1980 | Germany . |
| 8611812 | 8/1987 | Germany . |
| 8713171 | 11/1987 | Germany . |
| 3827875A1 | 2/1990 | Germany . |
| 2036547 | 7/1980 | United Kingdom ............... 15/250.453 |
| WOA9374958 | 8/1993 | WIPO . |

*Primary Examiner*—Gary K. Graham
*Attorney, Agent, or Firm*—J. Gordon Lewis

[57] ABSTRACT

A replacement assembly for a wiper blade for cleaning the windshield of a motor vehicle includes an elastic wiper blade assembly that has a top part and a wiper lip, with one respective elastic rail inserted into two lateral longitudinal grooves in the top part and retained therein by a retaining clip. An end piece on the end and the retaining clip both hold the elastic rails in the longitudinal grooves. The end piece is attached to one end of the wiper blade assembly, with said end piece securing the wiper blade assembly on the wiper blade frame in the longitudinal direction with the end to insure simple and safe handling of the replacement assembly.

3 Claims, 3 Drawing Sheets

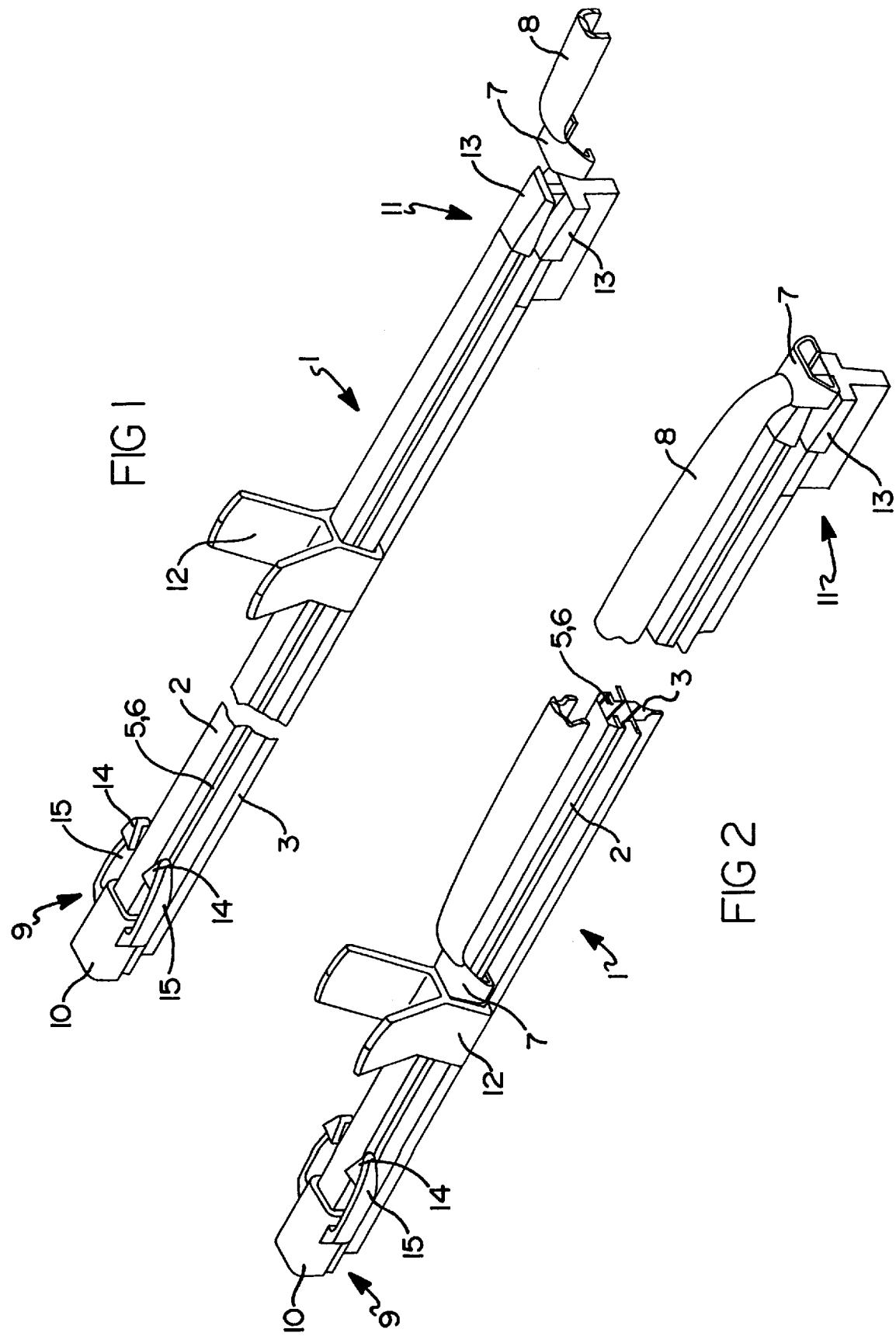

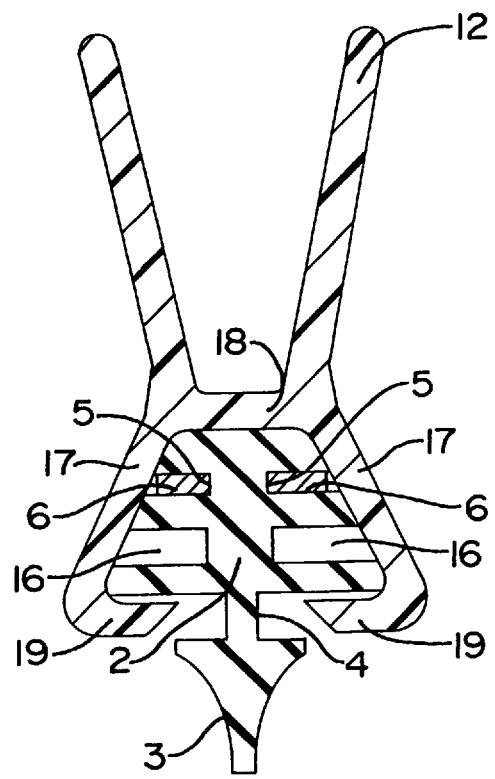
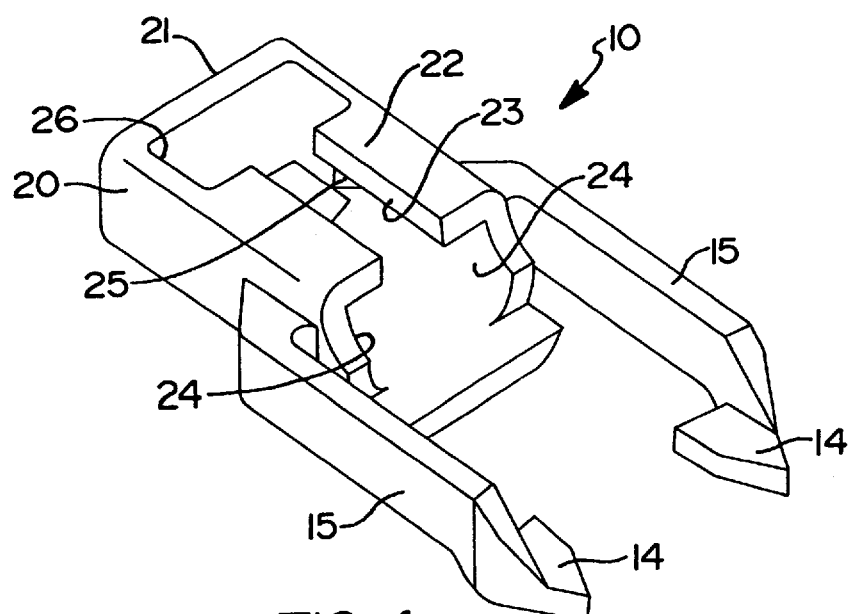

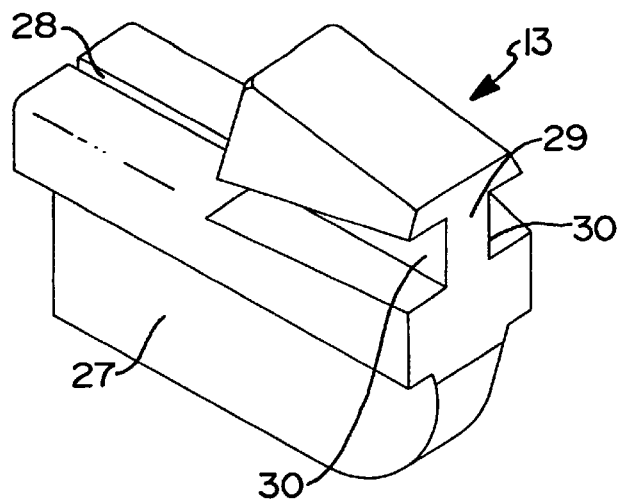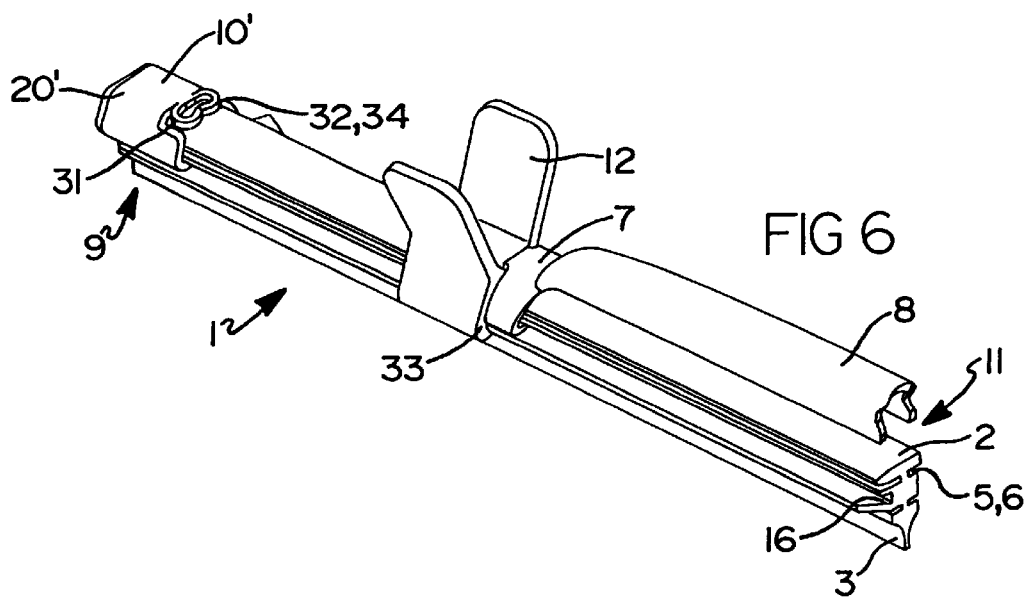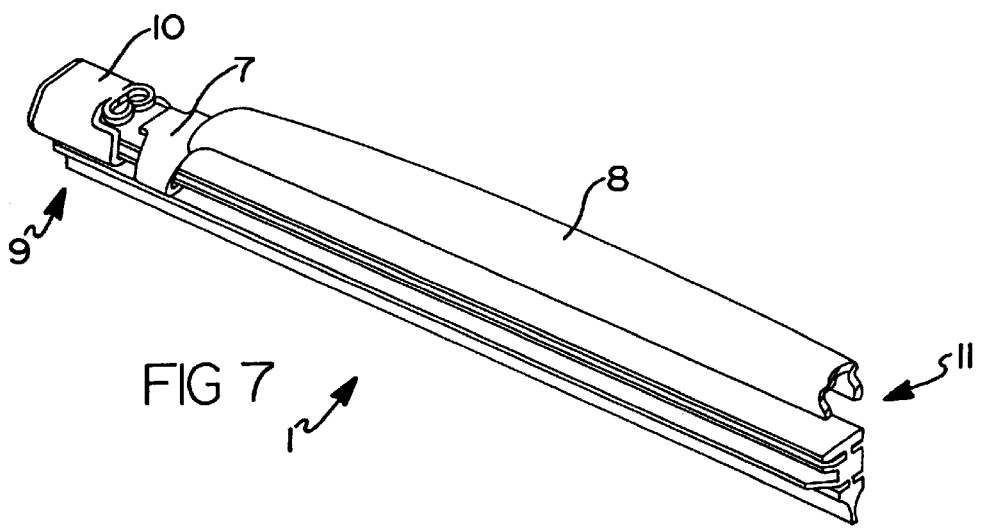

WIPER BLADE REPLACEMENT ASSEMBLY

FIELD OF THE INVENTION

The invention pertains to a replacement assembly for a wiper blade that serves for cleaning the windshield of a motor vehicle.

BACKGROUND OF THE INVENTION

Many conventional wiper blade assemblies consist of a top part and a wiper lip that is attached to the top part via a tiltable ridge. The top part is provided with a longitudinal groove on both sides, with elastic rails being laterally inserted into both longitudinal grooves. These elastic rails are secured from longitudinal displacement relative to the wiper blade assembly by means of holding elements. A rib on the wiper blade assembly which laterally engages into a corresponding notch in the elastic rail usually serves as the holding element. The elastic rails are prevented from laterally falling out of the longitudinal groove by means of claws that form part of the wiper blade frame and accommodate the wiper blade assembly.

Since the replacement of such wiper blade assemblies is quite complicated, DE-OS 3827875 proposes equipping the wiper blade replacement assembly with the required elastic rails and preventing said elastic rails from laterally falling out by means of at least one retaining clip. This retaining clip surrounds the top part of the wiper blade assembly as well as the elastic rails arranged in the longitudinal grooves. Here, the retaining clip(s) is/are only fixed to the top part of the wiper blade assembly with a relatively low clamping force. The unit so constructed is longitudinally inserted into the claws of the wiper blade frame, with the claws of the wiper blade frame engaging into guide grooves arranged in the sides of the top part of the wiper blade assembly. When inserting this unit, the retaining clips are held by the first claw of the wiper blade frame and subsequently displaced along the wiper blade assembly. Once the wiper blade assembly reaches its final position, the retaining clips fall off the top part of the wiper blade assembly. In order to prevent the wiper blade assembly from sliding out of the wiper blade frame, the wiper blade assembly is fixed to the wiper blade frame on the end that is situated opposite to the end that was initially inserted into the claws of the wiper blade frame. For this purpose, the end claws of the wiper blade frame snap into a recess arranged within the region of the guide groove after they pass over an inclined surface. Consequently, the end claw positively engages into the recesses with slight play, thereby securing the wiper blade assembly in the longitudinal direction.

When removing a worn wiper blade assembly from the wiper blade frame, it is necessary to widen the end claw that engages into the recesses by a certain amount. In order to ensure that this end claw properly engages into the recesses once a new wiper blade assembly has been inserted, it is necessary to press this end claw together again. Such permanent deformations cannot be repeated as often as desired without causing damage, particularly to the paint coating within this region. If only one retaining clip is used, it was determined that the elastic rails are still able to fall out of the longitudinal grooves at locations that are situated at a distance from the retaining clip due to the elasticity of the wiper blade assemblies and the elastic rails.

The present invention is based on the objective of additionally developing a wiper blade replacement assembly of the initially mentioned type in such a way that a simple and secure handling of the replacement assembly is ensured and damage is largely prevented.

SUMMARY OF THE INVENTION

According to the invention, this objective is attained with a replacement assembly in which an end piece is fastened to one end of the wiper blade assembly, with said end piece holding the elastic rails in the longitudinal grooves on this end, and in which a retaining clip is attached onto the wiper blade assembly such that it encompasses the top part of the wiper blade assembly as well as the elastic rails with a slight press fit at a distance from the end piece, preferably near the other end of the wiper blade assembly. Consequently, a preassembled unit is obtained in which the elastic rails are held in the longitudinal grooves of the wiper blade at two different points. According to the invention, the risk of the elastic rails sliding out of the longitudinal grooves of the wiper blade assembly during the mounting process is particularly high on the ends of the wiper blade assembly, particularly if the elastic rails are realized in curved fashion in order to generate a certain prestress of the wiper blade assembly. The aforementioned end piece eliminates the risk of the elastic rails sliding out of the longitudinal grooves on this end of the wiper blade assembly. One additional advantage is attained in that the end piece remains on the end of the wiper blade assembly after the mounting process and secures the wiper blade assembly on the wiper blade frame in the longitudinal direction, i.e., either alone or in cooperation with an additional component. A deformation of the claw for fixing this end of the wiper blade assembly on the wiper blade frame during the mounting of the replacement assembly is no longer required.

The handling of this preassembled unit which consists of the wiper blade assembly with inserted elastic rails as well as the end piece and an additional retaining clip is quite simple. The end of the wiper blade assembly which is situated opposite to the attached end piece is inserted into the first claw of the wiper blade frame in properly positioned fashion such that the claw engages into the guide grooves on the top part of the wiper blade assembly on both sides, i.e., the claw accommodates the upper portion of the top part as well as the elastic rails. During the additional insertion of the wiper blade assembly in the longitudinal direction, the retaining clip comes in contact with the first claw of the wiper blade frame. From here on, the retaining clip that can be easily displaced due to the slight press fit slides in the longitudinal direction of the wiper blade assembly. During the mounting process, the wiper blade assembly is successively inserted into the remaining claws of the wiper blade frame. Shortly before the end piece reaches the first claw of the wiper blade frame, the retaining clip must be removed from the wiper blade assembly. Subsequently, the wiper blade assembly is entirely inserted into the wiper blade frame and secured on the wiper blade frame in the longitudinal direction.

The retaining clip is configured similarly to a clothespin, with its two legs connected to one another by means of a crosspiece. One end of the legs is bent or angled inward in the form of a holding tab such that the holding tabs are able to engage underneath the top part of the wiper blade assembly. In addition, the space limited by the two legs, the crosspiece, and the two holding tabs approximately corresponds to the cross section of the top part of the wiper blade assembly. Consequently, the elastic rails are held in their longitudinal grooves as reliably as possible. When removing such a retaining clip from the wiper blade assembly, one presses both legs against one another at their free ends such that the leg parts that encompass the top part of the wiper blade assembly are spread sufficiently far apart to release the top part of the wiper blade assembly. If the retaining clip is inexpensively manufactured in one piece, the crosspiece may fracture when the ends of the legs are spread apart. In order to prevent such an occurrence and realize the retaining clips in reusable fashion, the crosspiece between the legs of the retaining clip can be realized in elastic fashion.

Despite all advantages attained with the invention, certain problems may still arise during the insertion of the wiper blade assembly into the claws of the wiper blade frame. Since the claws are of relatively small dimensions, the soft end surface of the wiper blade assembly can become jammed on the edges of the claw such that the insertion is obstructed. In order to solve this problem, the end of the wiper blade assembly which is inserted first is equipped with an insertion piece that is essentially situated on the end surface of the wiper blade assembly. This insertion piece is configured so that it maintains the profile of the wiper blade assembly which is determinative for insertion of the wiper blade assembly into the claws of the wiper blade frame, with the insertion piece tapering toward its free end. The insertion piece is advantageously fastened to the end of the wiper blade assembly in such a way that it can be removed without being destroyed. Consequently, the insertion piece can be reused several times.

In order to attain a simple handling of the replacement assembly, it is advantageous if the end piece arranged on the end of the wiper blade assembly consist of only one part.

Thus, the end piece consists of a hollow housing that is open on one end and closed by an end wall on the other end. The free cross section of this housing is designed so that the housing is able to accommodate the top part of the wiper blade assembly as well as the elastic rail with the elastic rails held in the lateral longitudinal grooves on this end of the wiper blade assembly. In order to ensure that this end piece is only attached to the top part on the end of the wiper blade assembly, the underside of the housing is provided with a slot that is able to accommodate the tiltable ridge of the wiper blade assembly. Consequently, the tiltable ridge extends through the underside of the end piece in such a way that the wiper lip can protrude freely. In order to lock the end piece on the end of the wiper blade assembly, it is equipped with corresponding elements, e.g., catch or clamping elements that, in particular, are situated on the inner side of the opposing side walls of the housing. These clamping or catch elements ensure a sufficiently rigid seating of the end piece on the end of the wiper blade assembly. However, they can also serve for fixing the elastic rails on the wiper blade assembly in the longitudinal direction. Such an end piece is very suitable for the manual handling of the preassembled replacement assembly during the insertion of a new wiper blade into the wiper blade frame and forms a visually appealing end section of the wiper blade end.

It is proposed to arrange an additional opening in the underside of the end piece housing, namely in the end wall of the closed end. The slot for accommodating the tiltable ridge of the wiper blade assembly preferably ends in this opening. This opening makes it possible to drain liquid from the interior of the end piece and simplifies the removal of the end piece from the wiper blade end. In the latter case, this opening serves as a mounting opening and allows the insertion of a tool, e.g., a screwdriver, in order to remove the end piece from the end of the wiper blade assembly.

When using relatively long wiper blades and/or wiper blades for curved windshields, it is necessary to ensure a relatively large displacement between the wiper blade assembly and the wiper blade frame. This is necessary because the elastic wiper blade assembly usually consists of rubber or an elastomer and is subject to a change in length due to temperature changes or its deflection relative to the wiper blade frame on a curved windshield. In this case, it is advantageous to fix only one of the two wiper blade ends on an end claw of the wiper blade frame such that it is secured in both longitudinal direction. In this way, it is ensured that the wiper blade assembly can be displaced relative to all remaining claws of the wiper blade frame.

In order to fulfill this requirement in an end piece according to the present invention, the end piece is equipped with two catch springs that extend in the longitudinal direction of the wiper blade assembly, such that they extend from the opposing side walls of the housing beyond its open end. These catch springs that are arranged at a distance from one another are provided with inwardly-directed catch tabs at their free ends. These catch tabs are so long that they surround the outer side of the end claw of the wiper blade frame in the assembled condition and engage behind the end claw with their catch tabs. Such an end piece can be inexpensively manufactured in the form of an integral plastic component.

When using relatively short wiper blades or wiper blades for an essentially planar windshield, it is advantageous if the wiper blade assembly is not directly fixed to the wiper blade frame, but rather in such a way that there exists a certain amount of longitudinal play between the wiper blade assembly and the wiper blade frame. The end of the wiper blade assembly is equipped with an end piece without catch springs for the end claw of the wiper blade frame. This end piece is only held on the end of the wiper blade assembly which is equipped with elastic rails. The other end of the wiper blade assembly which must be inserted into the claws of the wiper blade frame can be provided with the previously described insertion piece. A retaining clip that surrounds the top part and the elastic rail is attached to the wiper blade assembly near the end that must be inserted into the wiper blade frame. This replacement assembly also contains a loosely-enclosed end piece which is identical to the end piece arranged on the wiper blade assembly. After the wiper blade assembly is entirely inserted into the wiper blade frame, the insertion piece is removed from the inserted end of the wiper blade assembly which now protrudes from the other end of the wiper blade frame. The second loosely-enclosed end piece is now attached to this end of the wiper blade assembly, with said end piece fixed only to the wiper blade assembly. The length of the wiper blade assembly is chosen in accordance with the type of wiper blade used, such that the required longitudinal play between the end pieces and the corresponding end claws of the wiper blade frame is ensured. Consequently, each of the two end pieces that are attached to the wiper blade assembly limits the longitudinal displacement of the wiper blade assembly in one direction.

In order to dampen the contact between the end pieces and the respective end claw of the wiper blade frame and simultaneously reduce the noise developed during the operation of the windshield wiper system, it is proposed to equip both end pieces with the damping element according to claim 10 which is able to cooperate with the adjacent end claw of the wiper blade frame. According to claim 11, the damping element is advantageously realized in the form of an elastic tab, particularly one that has the form of a closed hollow profile. This elastic tab is advantageously realized in one piece that is integrally formed onto the end piece at the open end of the housing, particularly the end surface.

In order additionally to simplify the handling of the replacement assembly, the invention proposes the use of the advantageous embodiment according to FIG. 12. According to this embodiment, the individual components of the replacement assembly have different colors that correspond to their function. Components that remain on the wiper blade assembly after the mounting process are realized in the same color as the wiper blade assembly or the wiper blade frame. Components that must be removed during or after the mounting of the wiper blade assembly are realized in a different color than the wiper blade assembly or the wiper blade frame. This measure is intended to prevent the improper mounting of the wiper blade assembly on the wiper blade frame.

BRIEF DESCRIPTION OF THE DRAWINGS

FIG. 1 is a perspective view of a replacement assembly that is ready to be inserted into the claws of a wiper blade frame.

FIG. 2 is a perspective view of the replacement assembly during the insertion into the claws of a wiper blade frame.

FIG. 3 is a cross section through the replacement assembly within the region of the holding claw.

FIG. 4 is a perspective view of an end piece of a replacement assembly with an underside that, in contrast to FIG. 1, points toward the top.

FIG. 5 is a perspective view of an insertion piece of a replacement assembly according to FIG. 1.

FIG. 6 is a perspective view of another embodiment of a replacement assembly during the insertion into the wiper blade frame.

FIG. 7 is a perspective view of the replacement assembly according to FIG. 6 after the mounting on the wiper blade frame.

DETAILED DESCRIPTION OF A PREFERRED EMBODIMENT

The replacement assembly shown in FIG. 1 comprises a wiper blade assembly 1 of rubber which consists of a top part 2 and a wiper lip 3, with the top part 2 and the wiper lip 3 being integrally connected via a tiltable ridge 4 (FIG. 3). Two longitudinal grooves 5 are laterally arranged in the top part 2, with one elastic rail 6 being inserted into each longitudinal groove. In order to prevent that the elastic rails 6 laterally sliding out of the longitudinal grooves 5 during the insertion of the replacement assembly into the claws 7 of the schematically-indicated wiper blade frame 8, the elastic rails are held on the end 9 of the wiper blade assembly 1 by means of an end piece 10. The end piece 10 is realized in such a way that it can be pushed onto the end 9 of the wiper blade assembly 1 from the end surface of the wiper blade assembly and surround the top part 2 as well as the elastic rails 6. A retaining clip 12 is clamped onto the top part 2 with a slight press fit between the end piece 10 and the front end 11 of the wiper blade assembly 1. Although not clearly visible in FIG. 1 due to the partial cross section of the wiper blade assembly, the retaining clip 12 should be arranged between the front end 11 and the center of the wiper blade assembly 1. The retaining clip 12 surrounds the top part 2 of the wiper blade assembly 1 from the top and overlaps both elastic rails 6 situated in the longitudinal grooves 5, i.e., the elastic rails are secured from laterally sliding out of the longitudinal grooves 5.

The replacement assembly also comprises an insertion piece 13 that is essentially arranged on the end surface of the front end 11 of the wiper blade assembly 1 and serves for simplifying the insertion of the wiper blade assembly 1 into the claws 7 of the wiper blade frame 8.

The replacement assembly that is advantageously delivered in the preassembled condition shown in FIG. 1 is successively inserted into the individual claws 7 of the wiper blade frame 8, in such a way that its insertion piece 13 points toward the front. Once the retaining clip 12 comes in contact with the first claw 7, the retaining clip is retained by this claw 7 as shown in FIG. 2. The force with which the retaining clip 12 presses against the top part 2 of the wiper blade assembly 1 is so low that it can be displaced relatively easily along the wiper blade assembly 1. Consequently, the additional insertion of the wiper blade assembly 1 is not obstructed. Shortly before the end piece 10 reaches the retaining clip 12, the insertion process is interrupted and the retaining clip 12 is removed from the top part 2 of the wiper blade assembly 1. This is realized by spreading apart the retaining clip 12 and removing said retaining clip toward the top. The wiper blade assembly 1 is now further inserted into the wiper blade frame 8 until the inclined surfaces of the catch tabs 14 situated on the free ends of the catch springs 15 come in contact with the outer sides of the first claw 7 and snap behind their rear side after passing the claw 7. The wiper blade assembly 1 is now fixed on the first claw 7 of the wiper blade frame 8 with its end 9. The wiper blade assembly 1 is held in all other claws 7 of the wiper blade frame 8 such that it can be displaced in the longitudinal direction. In order to ensure the proper functioning of the wiper blade, the insertion piece 13 must be removed from the front end 11 of the wiper blade assembly 1. The proper mounting of the replacement assembly is encouraged due to the fact that the retaining clip 12 and the insertion piece 13 are realized in red. Consequently, there is a clear color contrast between these two components and the black wiper blade assembly 1 and the black end piece 10, i.e., the risk of forgetting to remove these components during or after mounting is thereby reduced.

FIG. 3 shows how the retaining clip 12 holds the elastic rails 6 on the top part 2 of the wiper blade assembly 1. The two elastic rails 6 are inserted into the upper longitudinal grooves 5 of the t op part 2. Guide grooves 16 that extend parallel to the longitudinal grooves 5 are arranged in the top part 2 beneath the longitudinal grooves 5. On the underside of the top part 2 that has an essentially trapezoidal cross section, the tiltable ridge 4 and the wiper lip 3 are integrally formed onto the top part. The retaining clip 12 that is realized similarly to a clothespin is essentially formed by two legs 17 that are connected to one another by a n elastic crosspiece 18 arranged between their two ends. At their lower end, the legs 17 are bent inward such that they converge and form the holding tabs 19 with their bent ends. The cross section limited by the crosspiece 18, the lower part of the legs 17, and the holding tabs 19 approximately correspond to the cross section of the top part 2. The retaining clip 12 is attached to the wiper blade assembly 1 that is equipped with the elastic rails 6 from the top, with the holding tabs 19 engaging underneath the top part 2. The retaining clip 12 is attached to the top part 2 with a slight press fit and holds the elastic rails 6 in the longitudinal grooves 5. The retaining clip 12 is arranged on the top part 2 so rigidly that it cannot be easily displaced by vehicular vibrations. However, the retaining clip is arranged on the top part so loosely that the retaining clip can be relatively easily displaced along the wiper blade assembly. When removing the retaining clip 12 from the wiper blade assembly 1, the holding tabs 19 are correspondingly spread apart by pressing together the upper ends of the legs 17.

The end piece 10 of the replacement assembly according to the invention which is shown in FIG. 4 is realized in the form of an integral plastic part, the main component of which is a hollow housing 20. This housing 20 is open on one end and closed by a rear wall 21 on the other. The free cross section of the housing 20 is realized in such a way that it is able to accommodate the top part 2 of the wiper blade assembly 1 as well as the elastic rails 6 that are inserted into the longitudinal grooves 5 and consequently prevents the elastic rails 6 from laterally sliding out of the longitudinal grooves 5. The underside 22 of the housing 20 which is situated on top in FIG. 4 comprises a longitudinal slot 23 that is at least slightly wider than the tiltable ridge 4 of the wiper blade assembly 1. Consequently, the end piece 10 can be attached to the end 11 of the wiper blade assembly 1 in the longitudinal direction as shown in FIG. 1. In order to ensure a sufficiently rigid seating of the end piece 10 on the wiper blade assembly 1, the housing 20 of the end piece 10 is equipped with stationary clamping or catch elements 25 on the opposing inner sides 24. These clamping or catch elements 25, of which only one is visible in FIG. 4, are pressed into the rubber material of the wiper blade assembly 1 or engage into corresponding recesses on the top part 2 of the wiper blade assembly 1 and, if so required, the elastic rails 6.

An opening 26 is arranged in the underside 22 of the housing 20 between the slot 23 and the rear wall 21. The slot 23 ends in this opening. The opening 26 primarily serves as a mounting opening that allows the insertion of a tool in order to remove the end piece 10 from the top part 2. In addition, liquid can be drained from the housing 20 via this opening 26. The two catch springs 15 with the catch tabs 14 are integrally formed onto the opposing outer sides of the housing 20 and extend longitudinally beyond the open end of the housing 20. In addition, the end piece 10 can be handled quite easily, particularly during the insertion of the replacement assembly into the wiper blade frame 8, such that the wiper lip 3 is correspondingly protected.

FIG. 5 shows one embodiment of an insertion piece 13 for the replacement assembly. The lower part 27 of the insertion piece 13 is hollow, such that it is able to accommodate the wiper lip 3 on the front end 11 of the wiper blade assembly 1. The tiltable ridge 4 of the wiper blade assembly 1 extends through the longitudinal slot 28 of the insertion piece 13, with the longitudinal slot 28 being slightly narrower than the tiltable ridge 4. Consequently, the insertion piece can be clamped onto the front end 11 of the wiper blade assembly in such a way that it can be removed without being destroyed. The upper part 29 of the insertion piece 13 directly adjoins the upper part 2 of the wiper blade assembly 1 on the front end 11. Inside this upper part 29, the cross section of the upper part 2 that lies above the guide grooves 16 is tapered, and the insertion grooves 30 for the claws 7 that are situated adjacent to the guide grooves 16 of the upper part are widened.

FIG. 6 shows an additional embodiment of the replacement assembly according to the invention during the insertion into the wiper blade frame 8 that is only schematically indicated in FIG. 6. In this replacement assembly, no insertion piece 13 is provided; however, the end surface is laterally beveled on the front end 11 of the wiper blade assembly 1 in order to simplify the insertion into the claws 7 of the wiper blade frame 8. The retaining clip 12 is realized in accordance with FIG. 1 or 3. This retaining clip fulfills the same function and is handled in the same fashion as described previously; consequently, this retaining clip is not described in detail at this point.

The end piece 10' according to FIG. 6 which is only fixed on the end 9 of the wiper blade assembly 1 that is equipped with the elastic rails 6 is realized similarly to the end piece according to FIG. 1 or 4. However, it differs from the aforementioned embodiments of an end piece due to the fact that its housing 20' is without catch springs 15. The upper side of the end piece 10' is recessed relative to the end surface on the open end of the housing 20' such that a recess 31 with open edges is formed. The side walls of the housing 20' adjoin this recess. A damping element 32 is arranged in recess 31. Dampening element 32 damps the contact with the wiper blade frame 8 while the mounted wiper blade assembly 1 is longitudinally displaced during the operation of the windshield wiper system. This damping effect occurs since the projection 33 which protrudes longitudinally outward from the claw 7 of the wiper blade frame comes in contact with the damping element 32.

The damping element 32 is advantageously realized in the form of an elastic tab 34 that is integrally formed onto the open end of the housing 20' of the end piece 10' and has the shape of a closed hollow profile.

This replacement assembly additionally comprises a second, identical end piece 10' which is loosely enclosed with the preassembled unit shown in FIG. 6. FIG. 7 shows that, after removing the retaining clip 12 and entirely inserting the wiper blade assembly 1, this second end piece 10' is attached onto the front end 11 of the wiper blade assembly 1 which protrudes from the wiper blade frame 8 and is fixed on the front end of the wiper blade assembly. The wiper blade assembly 1 is secured in the longitudinal direction by both end pieces 10' that are able to come in contact with the corresponding outer claw 7 of the wiper blade frame 8. The wiper blade assembly 1 is of such length that a sufficiently large play for ensuring the longitudinal displacement of the wiper blade assembly 1 relative to the wiper blade frame 8 is provided between the end pieces 10' and the outer claws 7. This embodiment is particularly advantageous for relatively short wiper blades. FIG. 7 shows only one end 9 of the wiper blade assembly 1 in the mounted condition; in this figure, the other end is realized similarly to the end shown.

We claim:

1. A replacement assembly for a wiper blade for cleaning a windshield of a motor vehicle comprising:

an elongated elastic replacement wiper blade assembly with a top part and a wiper lip that are connected to one another via a tiltable ridge, the tip part having a pair of lateral longitudinal grooves and a pair of guide grooves parallel to the longitudinal grooves, the guide grooves adapted to slidably receive a wiper blade frame end claw;

two elastic rails, each disposed in a respective one of the lateral longitudinal grooves;

a first end piece disposed over one end of the wiper blade and ends of the elastic rails, the first end piece having a housing with two opposing side walls and an open end which receives the end of the wiper blade hereby retaining the elastic rails in the longitudinal grooves, the first end piece having two catch springs extending in the longitudinal direction of the wiper blade assembly from the opposing side walls of the housing beyond the open end of the housing with each of the catch springs having a catch tab directed towards the other catch spring and adapted for snapping engagement with the wiper blade frame end claw, each of said catch tabs having a tapered end to facilitate insertion of the end claw into the first end piece and a flat end to retain the end claw from slipping out of said first end piece; and a second end piece having a tapered portion and a pair of insertion grooves formed therein, wherein said second end piece is disposed over an opposite end of the wiper blade from said first end piece such that said pair of insertion grooves are aligned with corresponding ones of said longitudinal guide grooves, said tapered portion adapted to guide said end claw onto said top part and said insertion grooves allowing passage of a part of said end claw to be received into said guide grooves.

2. The replacement assembly for a wiper blade as claimed in claim 1 further including a retaining clip having two legs connected by a cross piece to form an upper portion and a lower portion, the legs in the lower portion having holding tabs formed thereon, wherein said lower portion surrounds the top part and the two elastic rails thereby retaining the elastic rails in the longitudinal groove and said upper portion facilitates removal of the retaining clip in a perpendicular direction with respect to the top part.

3. The replacement assembly for a wiper blade as claimed in claim 1, wherein said second end piece is removable from the wiper blade.

* * * * *